US010560011B2

(12) United States Patent
Himmelmann

(10) Patent No.: US 10,560,011 B2
(45) Date of Patent: Feb. 11, 2020

(54) LINEAR ELECTROMECHANICAL ACTUATORS

(71) Applicant: Sikorsky Aircraft Corporation, Stratford, CT (US)

(72) Inventor: Richard A. Himmelmann, Beloit, WI (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 935 days.

(21) Appl. No.: 15/146,139

(22) Filed: May 4, 2016

(65) Prior Publication Data

US 2016/0329798 A1 Nov. 10, 2016

Related U.S. Application Data

(60) Provisional application No. 62/158,074, filed on May 7, 2015.

(51) Int. Cl.
*H02K 41/02* (2006.01)
*B64C 13/50* (2006.01)
(Continued)

(52) U.S. Cl.
CPC ............ *H02K 41/02* (2013.01); *B64C 13/36* (2013.01); *B64C 13/505* (2018.01); *H02K 11/21* (2016.01); *H02K 16/00* (2013.01); *H02K 41/031* (2013.01)

(58) Field of Classification Search
CPC ...... B64C 27/68; B64C 13/505; H02K 41/02; H02K 41/03; H02K 11/21; H02K 41/031;
(Continued)

(56) References Cited

U.S. PATENT DOCUMENTS 4,243,358 A * 1/1981 Carlock ............... B64C 27/605
416/114
4,274,808 A * 6/1981 Garner .................. B64C 27/72
416/1
(Continued)

FOREIGN PATENT DOCUMENTS

CN 201877980 U 6/2011
WO WO-2014/065308 A1 5/2014

OTHER PUBLICATIONS

Extended European Search Report dated Sep. 15, 2016 issued during the prosecution of European Patent Application No. 16168736.3 (6 pages).

*Primary Examiner* — Brian M O'Hara
*Assistant Examiner* — Michael B. Kreiner
(74) *Attorney, Agent, or Firm* — Cantor Colburn LLP

(57) ABSTRACT

An actuator includes a plurality of linear motors. A carriage is operatively connected to each linear motor to be driven by each of the linear motors. An output forcer rod is operatively connected to at least one of the linear motors to be driven by at least one of the linear motors. A position sensor is operatively connected to the output forcer rod to measure motion of the output forcer rod. A fly-by-wire system includes a plurality of electromechanical actuators. Each electromechanical actuator includes a plurality of linear motors. A flight control computer is operatively connected to the linear motors of each of the electromechanical actuators. The fly-by-wire system includes a plurality of hydraulic systems. Each hydraulic system is operatively coupled to a respective one of the electromechanical actuators.

20 Claims, 5 Drawing Sheets

(51) Int. Cl.
*H02K 16/00* (2006.01)
*H02K 41/03* (2006.01)
*H02K 11/21* (2016.01)
*B64C 13/36* (2006.01)

(58) Field of Classification Search
CPC ......... H02K 16/00; H02P 6/006; H02P 8/005; H02P 25/06; H02P 25/032
See application file for complete search history.

(56) References Cited

U.S. PATENT DOCUMENTS

| | | | | | |
|---|---|---|---|---|---|
| 4,521,707 | A * | 6/1985 | Baker | | F16H 25/20 310/112 |
| 4,721,873 | A * | 1/1988 | Stenudd | | H02K 41/03 310/12.15 |
| 5,081,381 | A * | 1/1992 | Narasaki | | B25J 9/123 310/12.01 |
| 5,801,462 | A | 9/1998 | Yagoto et al. | | |
| 7,218,019 | B2 * | 5/2007 | Potter | | H02K 5/04 310/112 |
| 7,378,765 | B2 * | 5/2008 | Iwasa | | H02K 33/00 310/14 |
| 7,576,452 | B2 * | 8/2009 | Shikayama | | H02K 41/03 310/12.23 |
| 7,828,245 | B2 * | 11/2010 | Suisse | | B64C 13/40 137/625 |
| 7,834,488 | B2 * | 11/2010 | Finkbeiner | | H02K 11/21 310/12.01 |
| 8,004,127 | B2 * | 8/2011 | Potter | | H02K 19/103 310/114 |
| 8,201,490 | B2 * | 6/2012 | Fenny | | F15B 15/1428 92/151 |
| 8,643,227 | B2 * | 2/2014 | Takeuchi | | H02K 41/031 310/12.19 |
| 8,888,036 | B2 * | 11/2014 | Chaduc | | B64C 13/503 244/17.13 |
| 9,473,009 | B2 * | 10/2016 | Hunter | | H02K 41/031 |
| 9,933,058 | B1 * | 4/2018 | Muster | | F16H 25/205 |
| 10,099,776 | B2 * | 10/2018 | Himmelmann | | F16H 25/20 |
| 2008/0258568 | A1 * | 10/2008 | Finkbeiner | | H02K 41/02 310/12.19 |
| 2010/0089053 | A1 * | 4/2010 | Hanlon | | B64C 13/42 60/545 |
| 2015/0222167 | A1 | 8/2015 | Aoyama et al. | | |
| 2016/0226349 | A1 * | 8/2016 | Mastrocola | | H02K 11/21 |
| 2016/0264239 | A1 * | 9/2016 | Fenny | | B64C 27/64 |
| 2017/0324315 | A1 * | 11/2017 | Satou | | H02K 41/02 |
| 2018/0002028 | A1 * | 1/2018 | Polcuch | | B64C 9/16 |
| 2018/0278138 | A1 * | 9/2018 | Satou | | H02K 41/031 |

\* cited by examiner

LINEAR ELECTROMECHANICAL ACTUATORS

CROSS-REFERENCE TO RELATED APPLICATIONS

This application claims the benefit of and priority to U.S. Provisional Patent Application Ser. No. 62/158,074, filed May 7, 2015, which is incorporated herein by reference in its entirety for all purposes.

BACKGROUND OF THE INVENTION

1. Field of the Invention

The present disclosure relates to actuators, and more particularly to actuators in fly-by-wire systems.

2. Description of Related Art

Vehicles like aircraft commonly include fly-by-wire flight control systems. Such systems typically include an actuator for communicating between a flight control computer and a hydraulic system. Traditionally, geared ball screw actuators have been used. These actuators typically include a permanent magnet motor, a resolver, bearings, multiple gears, a ball screw and a recirculating ball spline. In aircraft flight control systems, triplex redundancy is required so that in case any one, or two of the actuators fail, the aircraft will remain under control. Traditional systems use mechanical disconnects or clutches to segregate a faulty actuator. These additional mechanical components not only increase the size cost and complexity of the system, they also provide another possible source of failure.

Such conventional methods and systems have generally been considered satisfactory for their intended purpose. However, there is still a need in the art for improved actuator systems and methods. The present disclosure provides a solution for this need.

SUMMARY OF THE INVENTION

An actuator includes a plurality of linear motors. A carriage is operatively connected to each linear motor to be driven by each of the linear motors.

Each linear motor can include a stator and a forcer magnet. Each forcer magnet can be fixedly connected to the carriage. The carriage can include a leg operatively connected to a fastener for connecting the actuator to a hydraulic system. The actuator can include a plurality of bushings. Each bushing can be in sliding communication with the carriage to provide vertical and lateral support to the carriage. The actuator can include a housing surrounding the linear motors and the carriage. The housing can include a hole to accommodate for the linear motion of a leg of the carriage.

It is contemplated that, the plurality of linear motors can include three linear motors. The carriage can include a plurality of legs. Each leg can correspond to a respective one of the linear motors. The actuator can include a plurality of linear variable differential transformers (LVDT) housed within the carriage to measure the absolute displacement of the carriage. Each LVDT can correspond to a respective one of the linear motors. Each leg can house a respective one of the LVDTs.

In another aspect, an actuator includes a plurality of linear motors. An output forcer rod is operatively connected to at least one of the linear motors to be driven by at least one of the linear motors. A position sensor is operatively connected to the output forcer rod to measure motion of the output forcer rod.

At least one of the forcer magnets can be operatively connected to the output forcer rod to linearly drive the output forcer rod. The output forcer rod can include a mount to attach to an input linkage of a mechanical hydraulic servo-actuator. The actuator can include a plurality of bushings. Each bushing can be operatively connected to the output forcer rod to provide vertical and lateral support to the output forcer rod. Actuator can include a housing surrounding the linear motors and the output forcer rod. The housing can include a hole to accommodate the linear motion of the output forcer rod. The position sensor can include a plurality of linear variable differential transformers (LVDT) within the housing operatively connected to the output forcer rod to measure the absolute displacement of the output forcer rod. The actuator can include a flight control surface of an aircraft operatively connected to the output forcer rod.

In another aspect, a fly-by-wire system includes a plurality of electromechanical actuators. Each electromechanical actuator includes a plurality of linear motors. A flight control computer is operatively connected to the linear motors of each of the electromechanical actuators. The fly-by-wire system includes a plurality of hydraulic systems. Each hydraulic system is operatively coupled to a respective one of the electromechanical actuators. The fly-by-wire system can include a flight control surface of an aircraft operatively connected to at least one of the hydraulic systems.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
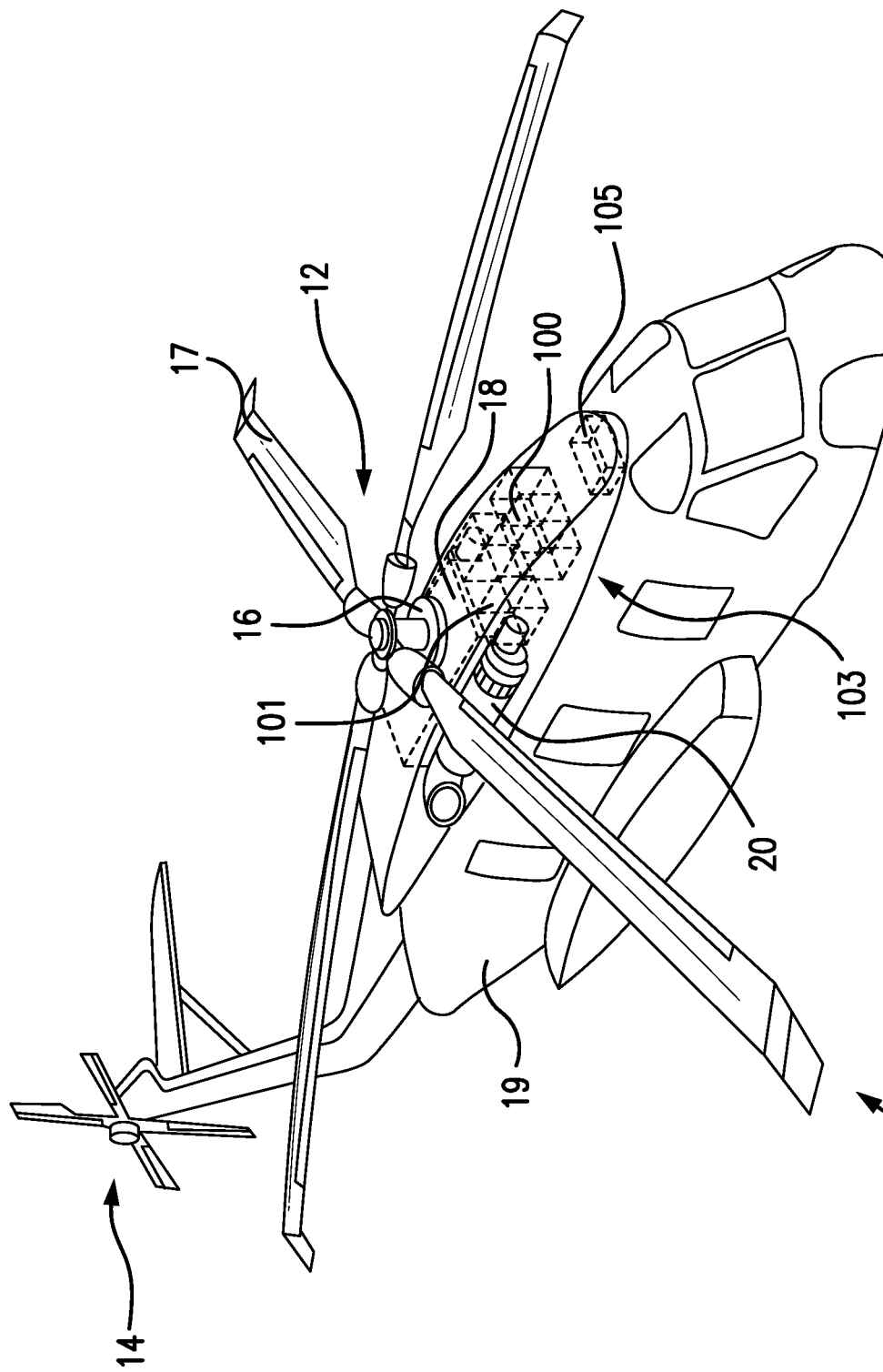
FIG. 1 is a schematic view of an exemplary embodiment of a vertical take-off and landing (VTOL) aircraft constructed in accordance with the present disclosure, showing actuators operatively connected to hydraulic systems and a flight control computer.

Reference will now be made to the drawings wherein like reference numerals identify similar structural features or aspects of the subject disclosure. For purposes of explanation and illustration, and not limitation, a partial view of an exemplary embodiment of an aircraft, here, an exemplary embodiment of an aircraft as a vertical takeoff and landing (VTOL) aircraft in accordance with the disclosure is shown in FIG. 1 and is designated generally by reference character 10. Other embodiments of aircraft in accordance with the disclosure, or aspects thereof, are provided in FIGS. 2-4, as will be described. The systems and methods described herein provide for increased reliability actuators that can be used in fly-by-wire systems, while reducing the amount of components and weight as compared with traditional actuator systems.

As shown in FIG. 1, VTOL aircraft 10 includes a main rotor system 12 and tail rotor system 14 supported by an airframe 19. Airframe 19 includes a gearbox 18 interconnecting an engine 20 with main rotor system 12 and tail rotor system 14. Main rotor system 12 is operatively connected to a swash plate 16. Swash plate 16 is operatively connected to hydraulic systems 101. VTOL aircraft 10 includes linear actuators 100, e.g. electromechanical actuators, operatively connected to the hydraulic systems 101, for example, a mechanical hydraulic servoactuator. Although a particular VTOL aircraft configuration is illustrated and described in the disclosed embodiment, other configurations and/or machines, such as fixed wing aircraft, high speed compound rotary wing aircraft with supplemental translational thrust systems, dual contra-rotating, coaxial rotor system aircraft, turbo-props, tilt-rotors and tilt-wing aircraft, will also benefit from the present invention.

With continued reference to FIG. 1, a fly-by-wire system 103 includes three actuators 100. System 103 includes a flight control computer 105 operatively connected to each of actuators 100. Each actuator 100 of system 103 is operatively connected to a respective one of hydraulic systems 101. System 103 includes a flight control surface 17 of a rotorcraft, e.g. VTOL aircraft 10, operatively connected to at least one of three hydraulic systems 101 through swash plate 16.

Figure 2:
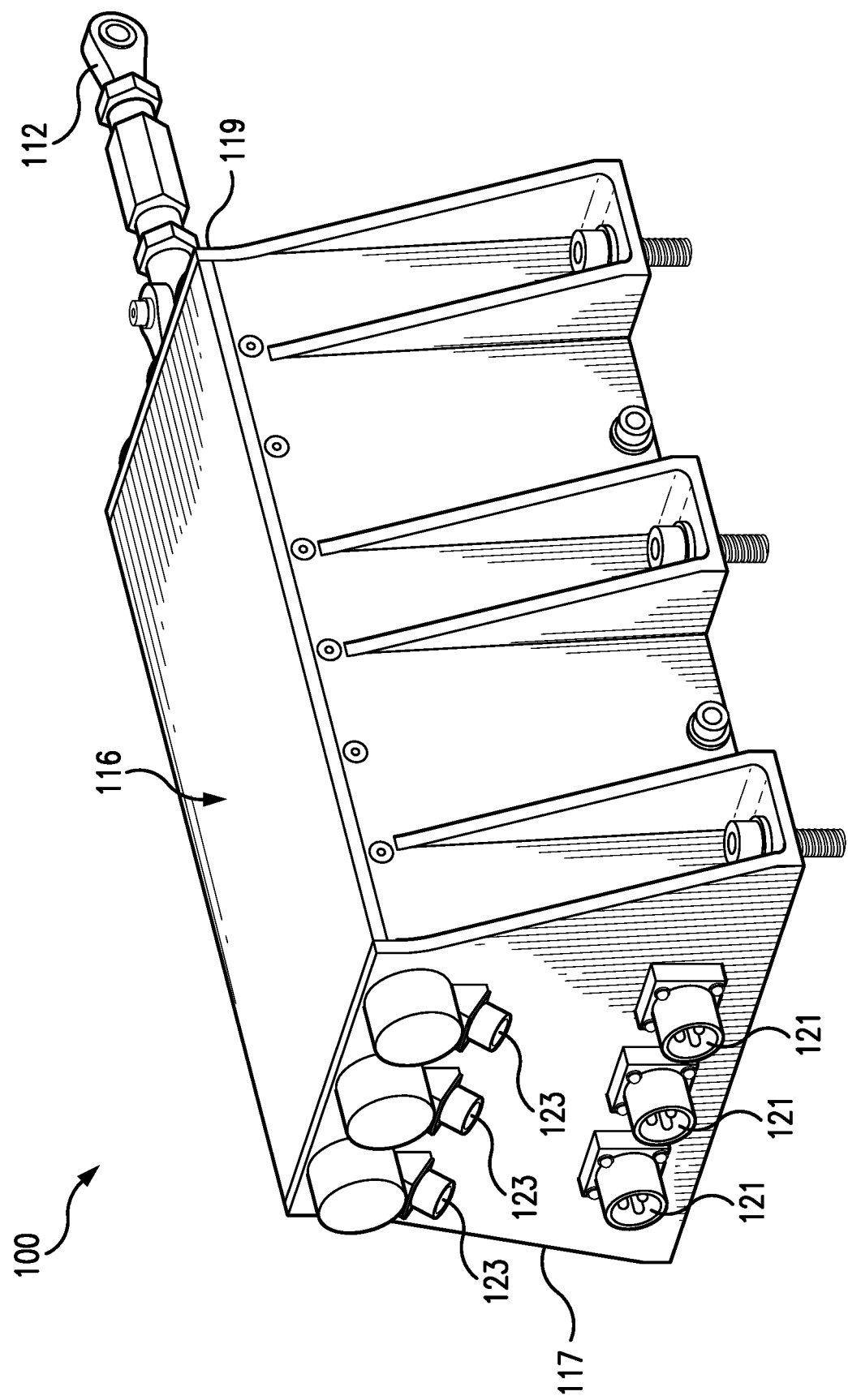
FIG. 2 is a perspective view of one of the actuators in the VTOL aircraft of FIG. 1, showing the actuator housing and the turnbuckle.

With reference now to FIGS. 1 and 2, actuator 100 includes a housing 116. Housing 116 includes a connector side 117 and a forcer rod side 119. Housing connector side 117 includes motor power connectors 121 and signal connectors 123. Motor power connectors 121 are operatively connected between a motor drive 125, schematically shown in FIG. 3B, and respective linear motors 102, described below, to operatively connect linear motors 102 to motor drive 125. Actuator 100 includes a plurality of linear variable differential transformers (LVDT) 120, e.g. a position sensor, to measure the absolute displacement of linear motors 102. Signal connectors 123 operatively connect respective LVDTs 120 to flight control computer 105. Signal connectors 123 receive actuator position signals from each LVDT 120 and send them on to flight control computer 105, which compares the true position of actuator 100 to the commanded position from the pilot.

Figure 3A:
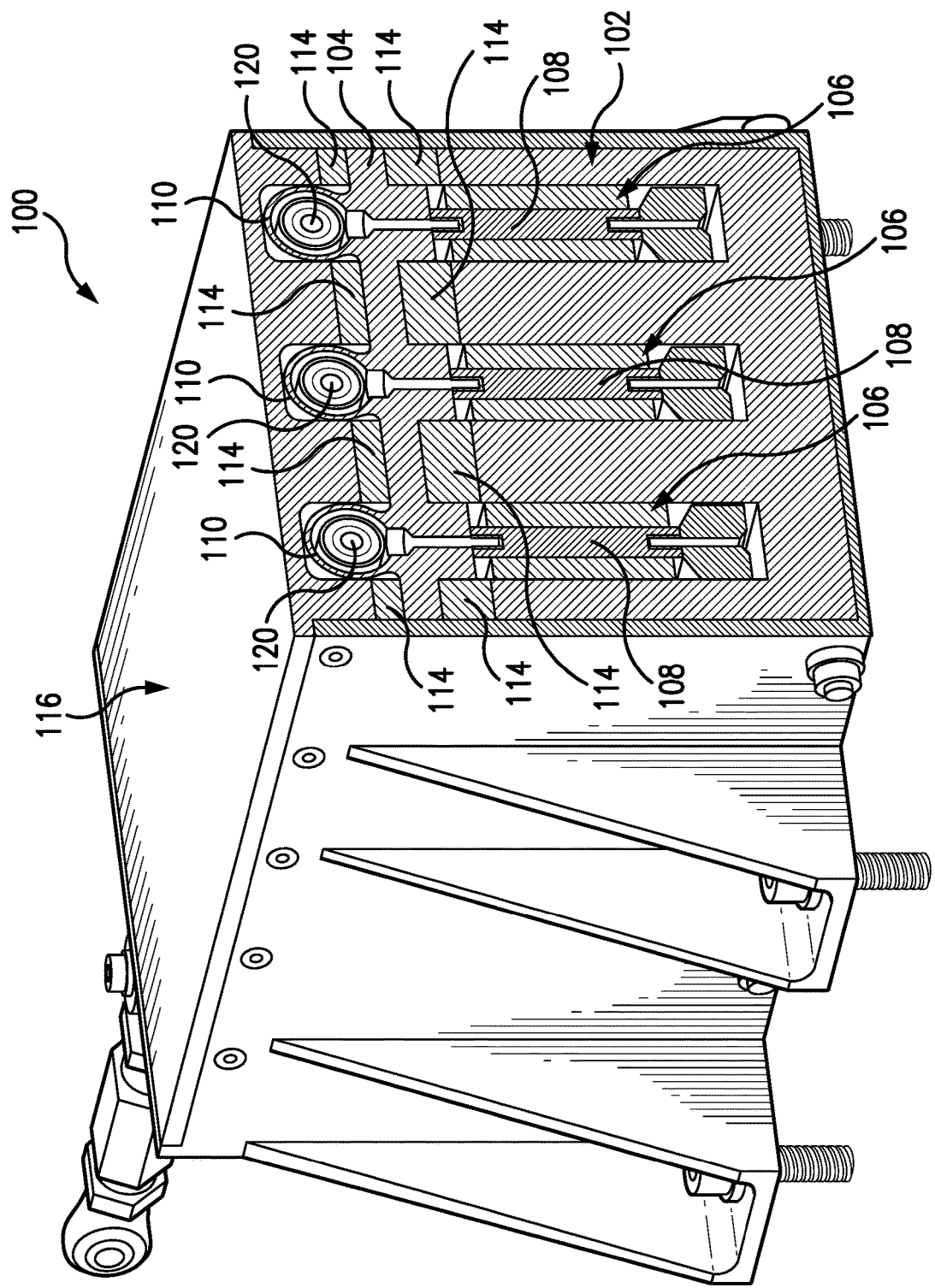
FIG. 3A is a cross-sectional perspective view of the actuator of FIG. 2, showing three linear motors within the housing of the actuator.

As shown in FIG. 3A, actuator 100 includes three linear motors 102. While three linear motors 102 are shown in actuator 100, it is contemplated that any suitable number of linear motors in parallel or series can be used to achieve the desired failure rate and level of redundancy, for example, one, two, four or five linear motors can be used. Each linear motor 102 includes a stator 106 and a forcer magnet 108. Each stator 106 has two halves, one on each side of forcer magnet 108. Each forcer magnet 108 is fixedly connected to carriage 104 so that carriage 104 moves between a retracted position (FIGS. 2 and 3A) and an expanded position (FIG. 4) during operation of each of linear motors 102. Actuator 100 includes a plurality of bushings 114. Bushings 114 are in sliding communication with legs 110, e.g. output forcer rods, of carriage 104 to provide vertical and lateral support to carriage 104, and in turn linear motors 102. Those skilled in the art will readily appreciate that bushings 114 can be self-lubricated, fiber-reinforced Teflon bushings, or another suitable bushing. Those skilled in the art will readily appreciate that linear motors 102 provide increased reliability and reduced possibility of jamming, as compared with traditional actuators.

With continued reference to FIG. 3A, LVDTs 120 of actuator 100 are housed within respective legs 110 of carriage 104 to measure the absolute displacement of carriage 104 and the absolute displacement of linear motors 102. LVDTs 120 are independent and provide the position sensing for both motor commutation and actuator output position. In the event that any one or two of linear motors 102 were to fail, the final motor would continue to drive carriage 104.

Figure 3B:
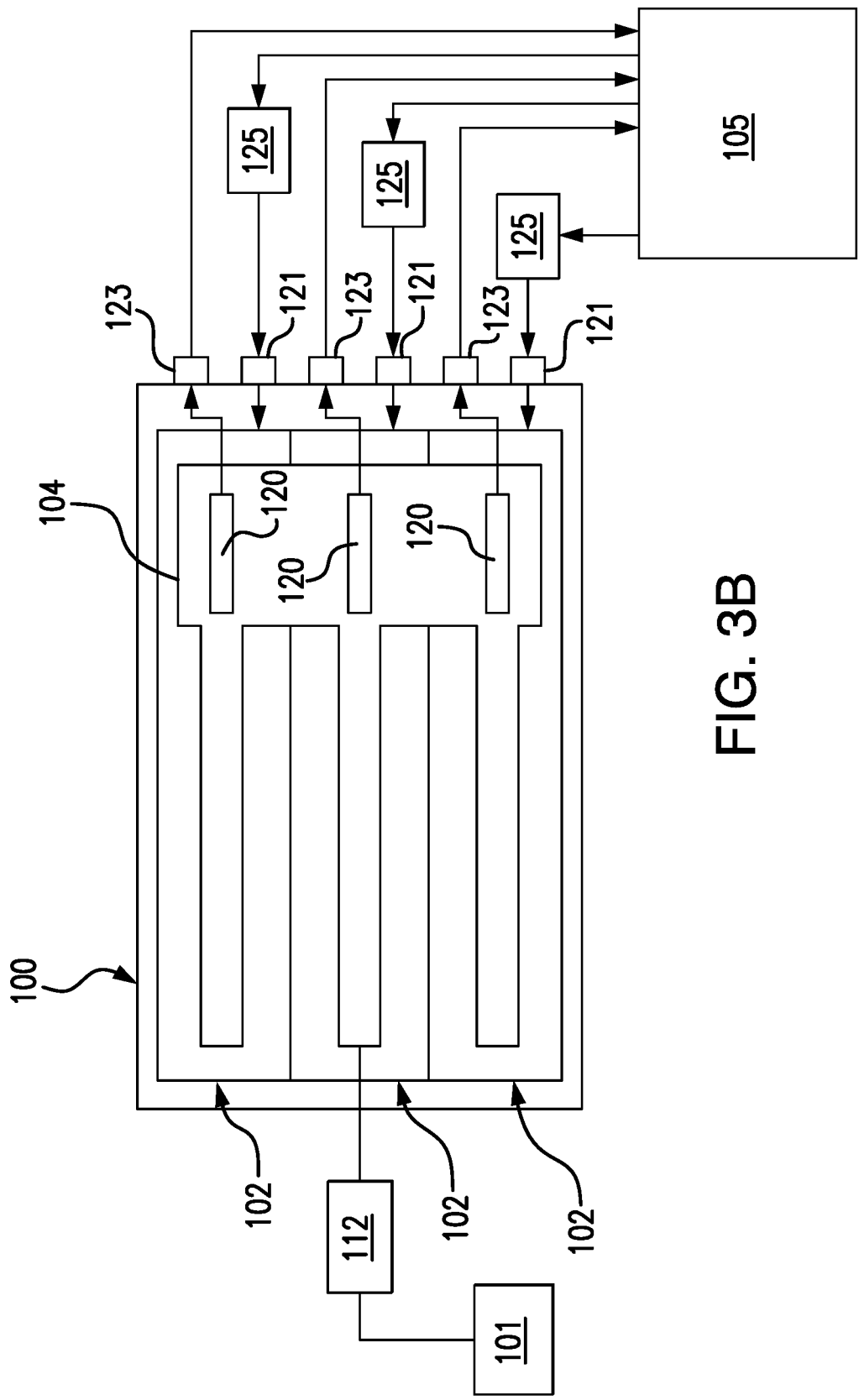
FIG. 3B is a schematic depiction of the actuator of FIG. 2, showing the connections between the signal connectors and motor power connectors.

As schematically shown in FIG. 3B, signal connectors 123 each correspond to a respective LVDT 120. Each LVDT 120 is in electrical communication with flight control computer 105 through signal connectors 123 to convey the position of LVDTs 120 and carriage 104. The position of carriage 104 corresponds to a respective position of each one of linear motors 102. As such, by monitoring the position of carriage 104 and LVDTs 120 through signal connectors 123, flight control computer 105 can appropriately adjust the power sent from motor drives 125 to linear motors 102 through motor power connectors 121 in order to achieve a desired position of carriage 104 along the longitudinal axis of actuator 100. The desired position of carriage 104 will depend on the input from the pilot or other control system. Those skilled in the art will readily appreciate that actuator 100 segregates three motor power connectors 121 and the three signal connectors 123, providing true redundancy between the systems, reducing the probability of failure due to a connector shorting out, or getting wet and losing connectivity.

Figure 4:
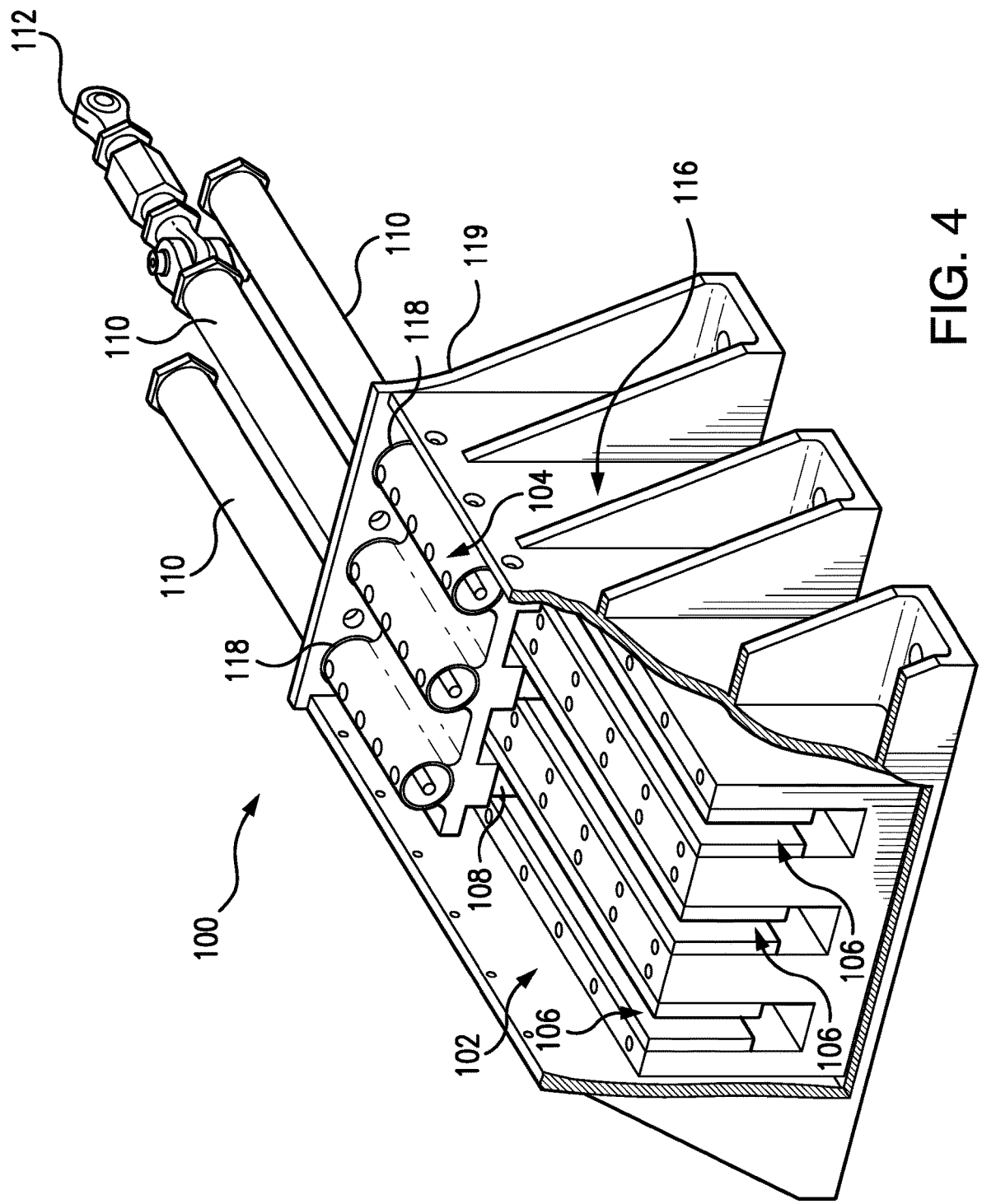
FIG. 4 is a perspective cut-away view of a portion of the actuator of FIG. 2, showing a portion of the housing cut-away to expose the linear motors and carriage.

With reference now to FIGS. 1 and 4, carriage 104 is shown in an extended position with respect to housing 116. On forcer rod side 119, housing 116 includes holes 118 to accommodate for the linear motion of legs 110. Each leg 110 corresponds to a respective one of linear motors 102. One leg 110 of carriage 104 is operatively connected to a mount or fastener, for example, a turnbuckle 112, or the like. Turnbuckle 112 operatively connects actuator 100 and carriage 104 to a respective hydraulic system 101, schematically shown in FIG. 3B. Carriage 104 moves between retracted and expanded positions along the longitudinal axis of linear actuator 100 to drive hydraulic system 101. Hydraulic system 101 is operatively connected to swashplate 16 to drive one or more flight control surfaces 17.

The systems and methods of the present disclosure, as described above and shown in the drawings, provide for actuators for fly-by-wire systems with superior properties including increased reliability and reduced weight. While the apparatus and methods of the subject disclosure have been shown and described with reference to VTOL aircraft, those skilled in the art will readily appreciate the systems and methods described herein are applicable to fixed wing aircraft, ground vehicles (e.g. construction and mining equipment), robotics, and process control machinery. Those skilled in the art will also readily appreciate that changes and/or modifications may be made to embodiments described above without departing from the spirit and scope of the subject disclosure.

What is claimed is:

1. An actuator comprising:
   a plurality of linear motors; and
   a carriage operatively connected to each linear motor to be driven by each of the linear motors, the carriage separately surrounding each one of a plurality of linear variable differential transformers (LVDT).

2. An actuator as recited in claim 1, wherein each linear motor includes a stator and a forcer magnet, wherein each forcer magnet is fixedly connected to the carriage.

3. An actuator as recited in claim 1, wherein the carriage includes a leg operatively connected to a fastener for connecting the actuator to a hydraulic system.

4. An actuator as recited in claim 1, further comprising a plurality of bushings, each bushing in sliding communication with the carriage to provide vertical and lateral support to the carriage.

5. An actuator as recited in claim 1, further comprising a housing surrounding the linear motors and the carriage.

6. An actuator as recited in claim 5, wherein the housing includes a hole to accommodate for the linear motion of a leg of the carriage.

7. An actuator as recited in claim 1, wherein the plurality of linear motors includes three linear motors.

8. An actuator as recited in claim 1, wherein the carriage includes a plurality of legs, wherein each leg corresponds to a respective one of the linear motors.

9. An actuator as recited in claim 1, wherein the plurality of linear variable differential transformers (LVDT) housed within the carriage measure the absolute displacement of the carriage, wherein each LVDT corresponds to a respective one of the linear motors.

10. An actuator as recited in claim 9, wherein the carriage includes a plurality of legs, wherein each leg corresponds to a respective one of the linear motors, and wherein each leg houses a respective one of the LVDTs.

11. An actuator comprising:
    a plurality of linear motors;
    a carriage comprising an output forcer rod operatively connected to at least one of the linear motors to be driven by at least one of the linear motors; and
    a position sensor operatively connected to the output forcer rod to measure motion of the output forcer rod, the carriage separately surrounding the position sensor.

12. An actuator as recited in claim 11, wherein each linear motor includes a stator and forcer magnet, wherein at least one of the forcer magnets is operatively connected to the output forcer rod to linearly drive the output forcer rod.

13. An actuator recited in claim 11, wherein the output forcer rod includes a mount to attach to an input linkage of a mechanical hydraulic servoactuator.

14. An actuator as recited in claim 11, further comprising a plurality of bushings, each bushing operatively connected to the output forcer rod to provide vertical and lateral support to the output forcer rod.

15. An actuator as recited in claim 11, further comprising a housing surrounding the linear motors and the output forcer rod.

16. An actuator as recited in claim 15, wherein the housing includes a hole to accommodate the linear motion of the output forcer rod.

17. An actuator as recited in claim 15, wherein the position sensor comprises a plurality of linear variable differential transformers (LVDT) within the housing operatively connected to the output forcer rod to measure the absolute displacement of the output forcer rod.

18. An actuator as recited in claim 11, further comprising a flight control surface of an aircraft operatively connected to the output forcer rod.

19. A fly-by-wire system comprising:
    a plurality of electromechanical actuators, each electromechanical actuator including a plurality of linear motors such that a carriage comprises the plurality of linear motors, the carriage separately surrounding each one of a plurality of linear variable differential transformers (LVDT);
    a flight control computer operatively connected to the linear motors of each of the electromechanical actuators; and
    a plurality of hydraulic systems, wherein each hydraulic system is operatively coupled to a respective one of the electromechanical actuators.

20. A fly-by-wire system as recited in claim 19, further comprising a flight control surface of an aircraft operatively connected to at least one of the hydraulic systems.

* * * * *